Jan. 17, 1967 — T. C. PATTON — 3,298,102

GRASS CLIPPER

Filed Oct. 7, 1964

INVENTOR
TEMPLE C. PATTON

3,298,102
GRASS CLIPPER
Temple C. Patton, 105 Oxford Terrace,
Westfield, N.J. 07090
Filed Oct. 7, 1964, Ser. No. 402,202
7 Claims. (Cl. 30—248)

My invention relates to the improvements in the method of, and the apparatus for, clipping grass and the like.

Grass clippers of the prior art are essentially scissors. Two handles are mechanically attached either directly or indirectly to scissor cutting blades and the crossing of the blades to effect the cutting action is accomplished by squeezing the handles together. The grass clipper of the present invention has only one handle and the cutting action is effected by moving this handle back and forth. Moreover, as opposed to conventional grass clippers, the improved grass clipper of the invention is such that most of the energy that is expended on the clipper is channelled into useful cutting action. As a result clipping can be accomplished more rapidly and with less expenditure of physical effort.

An important object of this invention is to provide a grass clipper that conserves mechanical energy.

A further object of this invention is to provide a design for a grass clipper apparatus that embodies a mechanism for conserving mechanical energy.

Still another object of this invention is to provide an improved grass clipper that is fast acting, that is easy to manipulate, and that requires a low input of energy for its operation.

Figure 2:
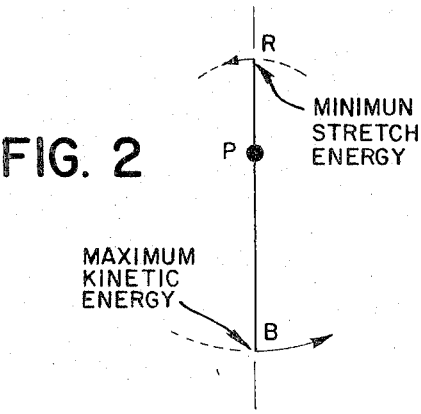
FIGURES 2 and 3 are explanatory diagrams of the present invention.
Figure 3:
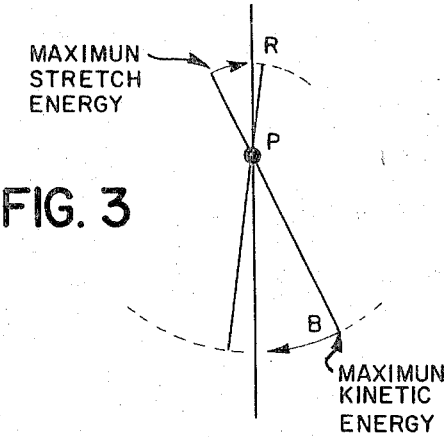
Figure 1:
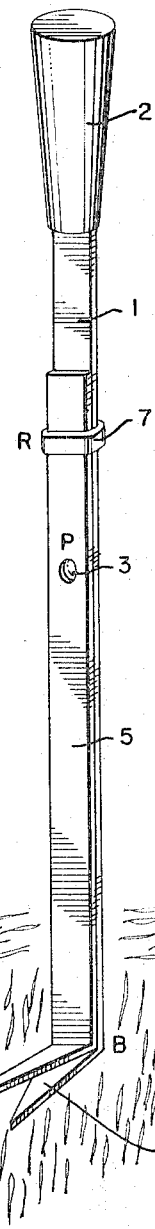
FIGURE 1 is a perspective view of the invention.

In the accompanying drawing, forming a part of this application and in which numerals are employed to designate the apparatus parts, the numeral 1 designates a main bar that has a handle 2 at its upper end, a pivot arrangement 3 at or near its center, and a cutting blade 4 connected to it at right angles at its lower end. A shorter swivel bar 5 that has a similar cutting blade 6 affixed to it at right angles at its lower end, is arranged to rotate around the pivot point 3 of main bar 1 so that the cutting blade 6 of swivel bar 5 crosses the cutting blade of main bar 1 to provide a cutting action. A tension assembly, which may comprise a heavy rubberband 7, affixed at two suitable points on the two bars respectively provides a restoring tension force that acts to bring the two cutting blades together when they are forced apart.

The operation of the improved grass clipper is as follows: The main bar 1, held vertically above the grass to be clipped, by handle 2, is given a back and forth motion. This to and fro motion of the main bar is communicated to the swivel bar 5 through the pivot point 3. Due to the unique arrangement of the apparatus parts, the back and forth motion that is picked up by the swivel bar will lag behind that of the main bar so that the two cutting blades 4 and 6 at the ends of bars will continually criss-cross each other in a continuous cutting action that synchronizes with the back and forth motion of the bar handle 2.

The back and forth motion of the handle is easily regulated by manual control so that the swivel bar takes on a natural pendulum or oscillatory motion about the pivot point 3 resulting in turn in the oscillatory cutting action that is provided at the edges of the two cutting blades. Heavy grass will require a more vigorous back and forth swing whereas light growth will require a less vigorous motion.

The back and forth motion of the swivel blade operates in conjunction with the tension assembly 7 to provide a conservation of energy. Thus, when the cutting blades 4 and 6 are furtherest apart, their kinetic or moving energy is zero whereas the tension force of rubberband 7 acting to bring them together is a maximum at this position of maximum displacement. The tension force acting on the swivel bar whips the cutting blades to their closed position. At the exact moment of crossing, the swivel bar possesses maximum kinetic energy whereas the tension force is nil. The swivel bar is carried by its momentum to the other side of the main bar where it immediately becomes subjected to the restraining force of the tension assembly 7. This decelerates the swivel bar and brings it to rest at its maximum point of displacement. However, during this operation, energy is being transferred to the tension assembly 7. This swapping of energy is again repeated so that there ensues a continuing transfer of energy back and forth between the swivel bar and the tension assembly.

During this interchange of energy, there is a gradual reduction in the overall energy level due to frictional losses and to the work that must be expended in cutting the grass as the blades cross each other. Other than this, energy is conserved. Hence, only enough energy to satisfy the frictional and cutting demands that arise during the clipping operation needs to be supplied to the handle 2 of the grass clipper.

It is to be understood that the form of my invention, herewith shown and described, is to be taken as a preferred example of the same, and that various changes in the shape, size, and arrangement of parts may be resorted to without departing from the spirit of my invention, or the scope of the subjoined claims.

Having described my invention, I claim:

1. A cutting device, comprising a first bar having a blade extending at an angle therefrom, a second bar having a blade extending at an angle therefrom, said blades including respective cutting edges adapted to move past each other as a cutting means, pivot means for supporting said second bar intermediate its ends for clockwise and counter-clockwise pivotal movement with respect to said first bar from an initial position in which said first and second bar are in substantial alignment, and tension means cooperating with said first and second bar for biasing said first and second bar in said substantial alignment.

2. A cutting device according to claim 1, wherein each of said blades includes two cutting edges facing in generally opposing directions, one cutting edge of one blade cooperating with one cutting edge of the other blade as a cutting means when said second bar is pivoted in a clockwise direction, the other cutting edge of said blade cooperating with the other cutting edge of said other blade as a cutting means when said second bar is pivoted in a counter-clockwise direction.

3. A cutting device according to claim 2, wherein substantial portions of said blade overlie each other when said second bar is in substantial alignment with said first bar.

4. A cutting device according to claim 3, wherein each of said blades is substantially transverse to its associated bar.

5. A cutting device according to claim 2, wherein each of said blades extends substantially transverse from its associated bar.

6. A cutting device according to claim 4, including handle means connected to said first bar towards the end opposite the blade attached thereto.

7. A cutting device according to claim 6, wherein said biasing means comprises an elastic band.

References Cited by the Examiner
UNITED STATES PATENTS
877,220  1/1908  Nilsson _____ 30—251 X WILLIAM FELDMAN, *Primary Examiner.*
J. C. PETERS, *Assistant Examiner.*